United States Patent
Li (10) Patent No.: US 9,479,218 B2
(45) Date of Patent: Oct. 25, 2016

(54) METHODS FOR LTE CELL SEARCH WITH LARGE FREQUENCY OFFSET

(71) Applicant: MEDIATEK Singapore Pte Ltd., Singapore (SG)

(72) Inventor: Junqiang Li, Irvine, CA (US)

(73) Assignee: MEDIATEK Singapore Pte Ltd., Singapore (SG)

( * ) Notice: Subject to any disclaimer, the term of this patent is extended or adjusted under 35 U.S.C. 154(b) by 100 days.

(21) Appl. No.: 13/867,936

(22) Filed: Apr. 22, 2013

(65) Prior Publication Data

US 2014/0314128 A1    Oct. 23, 2014

(51) Int. Cl.
| | |
|---|---|
| H04B 1/709 | (2011.01) |
| H04B 17/20 | (2015.01) |
| H04B 17/318 | (2015.01) |
| H04J 11/00 | (2006.01) |

(52) U.S. Cl.
CPC .............. *H04B 1/709* (2013.01); *H04B 17/20* (2015.01); *H04B 17/318* (2015.01); *H04J 11/0073* (2013.01)

(58) Field of Classification Search
CPC .................. H04L 27/2657; H04L 2027/0034; H04L 27/2686; H04J 11/0073; H04J 11/0069; H04J 11/0076; H04J 11/0086
USPC ................ 375/149, 150, 343–344, 347–349, 375/354–355; 370/210, 252, 335, 336, 342
See application file for complete search history.

(56) References Cited

U.S. PATENT DOCUMENTS

| | | | | |
|---|---|---|---|---|
| 6,266,687 B1* | 7/2001 | Leyonhjelm et al. | ........ | 708/420 |
| 6,728,203 B2* | 4/2004 | Wang | ................... | H04B 1/7075 370/210 |
| 2004/0161020 A1* | 8/2004 | Mathew | ............... | H04B 1/7083 375/149 |
| 2006/0018413 A1* | 1/2006 | Gupta | ................. | H04L 27/2665 375/343 |
| 2007/0140323 A1* | 6/2007 | Patel | ..................... | H04L 5/0048 375/149 |
| 2011/0026413 A1* | 2/2011 | Swarts | ................ | H04J 11/0073 370/252 |
| 2011/0026648 A1* | 2/2011 | Swarts | ................ | H04J 11/0086 375/343 |
| 2011/0103534 A1* | 5/2011 | Axmon et al. | ................ | 375/371 |
| 2011/0151817 A1* | 6/2011 | Swarts | ...................... | H03J 7/02 455/265 |
| 2011/0223901 A1* | 9/2011 | Swarts | ................ | H04L 27/2657 455/422.1 |
| 2011/0243104 A1* | 10/2011 | Swarts | ................ | H04J 11/0073 370/336 |
| 2013/0142165 A1* | 6/2013 | Swarts | ............... | H04L 27/2657 370/330 |
| 2013/0176941 A1* | 7/2013 | Swarts | ................ | H04J 11/0073 370/328 |

* cited by examiner

*Primary Examiner* — Daniel Washburn
*Assistant Examiner* — Eboni Hughes
(74) *Attorney, Agent, or Firm* — Imperium Patent Works; zheng jin; Helen Mao (57) ABSTRACT

Methods and devices for LTE cell search with large frequency offset are disclosed. In one embodiment of the invention, a UE divides the received signals into multiple frequency bins and transforms the signals into frequency domain through FFT. The UE performs correlating measures between the received signals and reference signals. The UE then performs an adaptive multi-try based peak selection such that the number of candidate is reduced. In one embodiment of the invention, the multi-try number is adaptively adjusted based on the channel condition. In one embodiment of the invention, the threshold of the peak selection is adaptively adjusted. In other embodiments of the invention, the UE performs non-coherent accumulation and selects a predefined number of coarse bin candidates. The number of non-coherent accumulation is adaptively adjusted. In another embodiment of the invention, the UE performs fractional frequency offset estimation and selects a fine bin candidate.

18 Claims, 9 Drawing Sheets

METHODS FOR LTE CELL SEARCH WITH LARGE FREQUENCY OFFSET

TECHNICAL FIELD

The disclosed embodiments relate generally to mobile communication networks, and, more particularly, to a LTE cell search with large frequency offset.

BACKGROUND

Long Term Evolution (LTE) is an improved universal mobile telecommunication system (UMTS) that provides higher data rate, lower latency and improved system capacity. To provide high data rate in a frequency selective fading environment, the downlink transmission utilizes Orthogonal Frequency Division Multiple Access (OFDMA) at the physical layer. However, one of the drawbacks of OFDMA is its vulnerability to Carrier Frequency Offset (CFO). Typical frequencies drift of 10 ppm ($10 \times 10^{-6}$) of the local oscillator results in an offset of 25 kHz. LTE system employs a fixed subcarrier spacing of 15 kHz. As a result, The typical frequency drifting of 10 ppm corresponds to 1.67 subcarrier spacing, while a large frequency offset up to 25 ppm corresponds to over four-subcarrier spacing. Such large frequency offset presents challenges for cell search in the LTE system.

In the LTE system, an evolved universal terrestrial radio access network includes a plurality of base stations, referred as evolved Node-Bs (eNBs), communicating with a plurality of mobile stations, referred as user equipment (UE). A UE may communication with a base station or an eNB via the downlink and uplink. Cell search as well as synchronization in the LTE system is performed in each UE by using both the Primary Synchronization Signal (PSS) and Secondary Synchronization Signal (SSS). The LTE wireless cellular system is designed with orthogonal frequency domain multiple access (OFDMA) in the physical layer. The incoming user data bits are multiplexed onto the assigned sub-carriers in frequency domain and transmitted as a single time-domain signal in downlink. This is accomplished by an inverse fast Fourier transform (IFFT) on the user data bits. For facilitating cell search procedures, known bit patterns are transmitted in specific time and frequency slots (also known as resource elements) for the mobile devices to be able to identify the cell's timing and its associated identifier (cell ID). A mobile device after being powered on, attempts to measure the received wideband power for specific frequencies over a set of frequency bands. After ranking the frequencies based on received signal strength indicator (RSSI), UE attempts cell search using the downlink synchronization channels.

The cell search procedure in LTE system can be performed in three steps. The first step is carried out by correlating the received Primary Synchronization Signal (PSS) samples to determine the cell's group identity out of three possible values and its timing information by determining the 5 ms boundary of cell's signal transmission. The latter is due to the fact that PSS signal is transmitted as the last symbol in 0th and 10th slots of a 10 ms frame. The second step is correlating the received samples of the secondary synchronization signal and reference signal to determine the cell identifier and frame timing. The third step is to verify the cell identification.

The initial cell search is a key process for the UE to establish communication channels with the eNB. The overall synchronization performance is dominated heavily by a robust PSS detection. However, the tradition PSS design is designed to work at low frequency offset. To support large frequency offset up to 25 ppm, a small coarse frequency bin with bandwidth smaller than 3.75 kHz is necessary. Each frequency bin and a corresponding PSC forms a hypothesis or a candidate. A multi-try based adaptive peak selection procedure should be used to reduce the number of candidates. The number of "try", for the peak selection procedure is adaptively adjusted based on a channel condition. The threshold for selecting the candidates is also adaptively adjusted. Further, when the Signal to Noise Ratio (SNR) is low, higher number of non-coherent accumulation is required. Therefore, the number of non-coherent accumulation should also be adaptively adjusted based on SNR. Other factors may be considered such as the complexity and system limitation in implementing the process. For example, the multiple peaks may be applied at a later stage such as in the fractional frequency estimation module, if the coarse frequency bin is not small enough due to complexity considerations.

SUMMARY

Methods and devices for LTE cell search with large frequency offset and interference cancellation are disclosed. In one embodiment of the invention, a UE, upon power on, receives downlink signals from an eNB. The UE divides the received signals into multiple frequency bins and transforms the signals into frequency domain through Fast Fourier Transform (FFT). The UE generates reference signals with primary synchronization code and transforms the signals into frequency domains through FFT. The UE performs correlating measures between the received signals and the reference signals and transforms the signals to time domain through Inverse FFT (IFFT). The UE then performs an adaptive multi-try based peak selection such that the number of candidate is reduced. In one embodiment of the invention, the multi-try number is adaptively adjusted based on the channel condition. In one embodiment of the invention, the threshold of the peak selection is adaptively adjusted.

In other embodiments of the invention, the UE performs non-coherent accumulation for each selected candidate from the first multi-try peak selection process and selects a predefined number of coarse bin candidates. In one embodiment of the invention, the number of non-coherent accumulation is adaptively adjusted based on Signal Noise Ratio (SNR) or other conditions. In another embodiment of the invention, the UE performs a fractional frequency offset estimation and selects a fine bin candidate.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
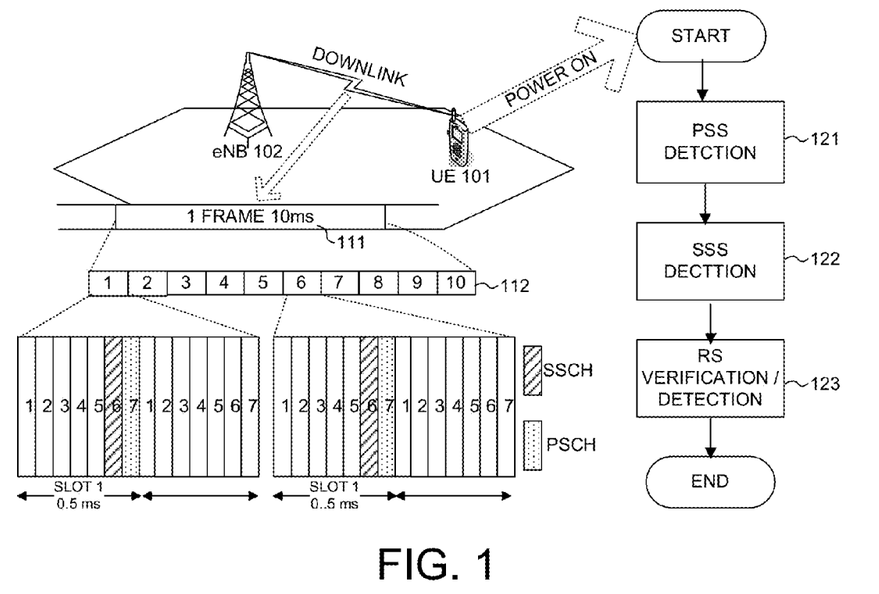
FIG. 1 schematically shows a wireless communication system and exemplary block diagram of cell search procedure and OFDM data frames that carries PSS and SSS signals.

FIG. 1 schematically shows a wireless communication system and exemplary block diagrams of cell search procedure and OFDM data frames that carry PSS and SSS signals. UE 101 is within the range of a cell served by eNB 102. eNB 102 transmits primary synchronization signals in its downlink channel. The downlink channels use OFDMA. Each OFDM frame 111 is 10 ms long. Each frame is divided into ten subframes of 1 ms. OFDM frame 111 consists of ten subframes as in frame 112. Subframes are also split into 0.5 ms slots. Such slot can contain seven OFDM symbols with normal Cyclic Prefix (CP) length and six with extended CP. Subframe one in frame 112 has two 0.5 ms slots, where each has seven symbols as in 113. Subframe six in frame 112 has two 0.5 ms slots, where each has seven symbols as in 114. In FDD cells, PSS is located in the last OFDM symbol (the seventh) in the first slot of subframe one and subframe six. SSS is located in the sixth symbol in the first slot of subframe one and subframe six. In TDD cells, PSS is sent in the third symbol of the 3rd and 13th slots while SSS is transmitted three symbols earlier. PSS gives UE information about to which of the three groups of physical layers the cell belongs to (three groups of 168 physical layers). One of 168 SSS sequences is decoded right after PSS, which defines the cell group identity directly.

UE 101, upon power on, starts PSS detection at Step 121. The PSS detection includes symbol timing detection and section ID detection in the time domain. Once PSS detection is done, at Step 122, UE 101 starts SSS detection. SSS detection includes frame timing detection, group ID detection and CP type and frame type detection. Upon succeeding in SSS detection, the last step 123 in the cell search for UE 101 is RS verification/detection, which verifies the detected cell.

Figure 2:
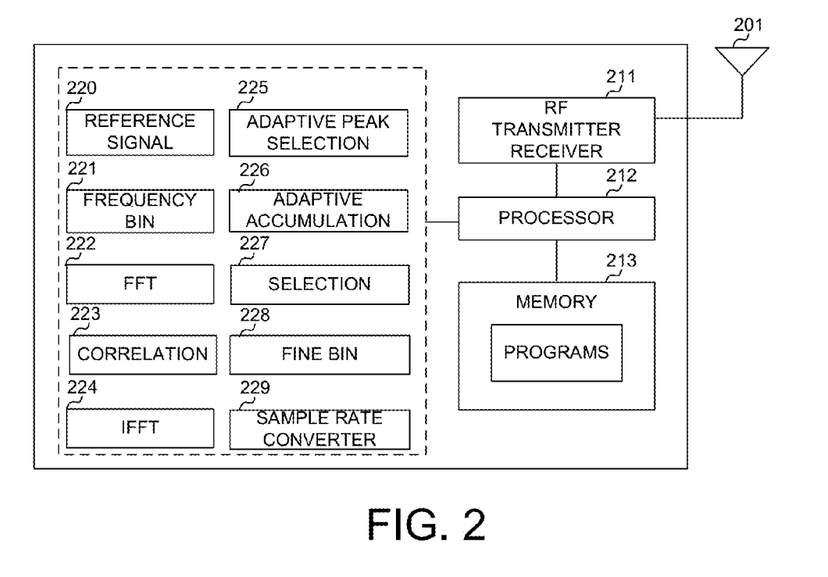
FIG. 2 shows an exemplary block diagram of an UE that supports some embodiments of the invention.

FIG. 2 shows an exemplary block diagram of a UE that supports some embodiments of the invention. The UE has RF transceiver module 211, coupled with antenna 201 receives RF signals from antenna 201, converts them to baseband signals and sends them to processor 212. RF transceiver 201 also converts received baseband signals from the processor 212, converts them to RF signals, and sends out to antenna 201. Processor 212 processes the received baseband signals and invokes different functional modules to perform features in the UE. Memory 213 stores program instructions and data to control the operations of the UE. FIG. 2 further illustrates ten functional modules 220 to 229 in the UE that carry out embodiments of the current invention. The functional modules may be implemented by hardware, firmware, software, or any combination thereof. Reference signal module 220 generates reference signals to be correlated with the received signals. Frequency bin module 221 divides the received signals into multiple frequency bins. FFT module 222 performs FFT to the received signals for further process. Correlation module 223 performs correlation measurement for peak selection. IFFT module 224 performs IFFT for time domain operation. Adaptive peak selection module 225 applies adaptive peak selection algorithm to select a group of hypothesis. Adaptive accumulation module 226 adjusts the number of accumulation adaptively and performs accumulation measurement. Selection module 227 selects a predefined number of coarse bin or a first group of candidates for further process. Fine bin module 228 performs fine bin selection from some selected coarse bins. Sample rate converter module 229 performs sample rate conversion.

Figure 3:
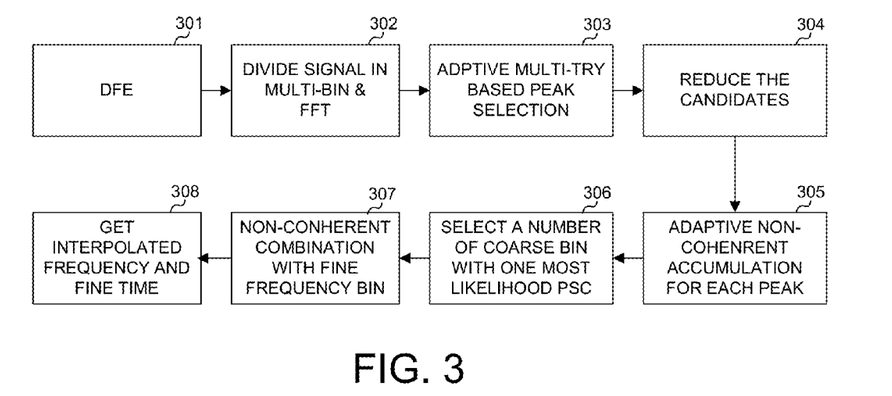
FIG. 3 shows an exemplary block diagram of steps for an adaptive multi-try based peak selection for an initial cell selection in accordance with embodiments of the invention.

FIG. 3 shows an exemplary block diagram of steps for an adaptive multi-try based peak selection for an initial cell selection in accordance with embodiments of the invention. A UE receives downlink signals from one or more eNBs upon power on. At Step 301, a digital front end (DFE) in the UE receives and process RF signals from an antenna. The output of the DFE feeds into a FFT unit. At Step 302, after FFT, the received signals are divided into multiple frequency bin hypothesis. The number of frequency bin is preferred to be thirty-eight in a large frequency offset environment for an LTE system. It can be set to other numbers depending on the overall system design and/or the condition of frequency offset. At Step 303, the UE performs an adaptive multi-try based peak selection for each frequency hypothesis, which is the combination of a frequency bin index and a Primary Synchronization Code (PSC). The peak selection is performed multiple times to compensate the large frequency offset. The number of times to retry the peak selection is adaptively determined based on the channel condition. Further, the threshold to select a next stage candidate is also adaptively adjusted. At Step 304, based on the peak selection at Step 303, the number of frequency hypothesis candidates is reduced. The reduction is based on the adaptive adjusted threshold value. At Step 305, the UE performs an adaptive non-coherent accumulation for each selected candidates. In an environment with low Signal Noise Ratio (SNR), higher number of non-coherent accumulation is required. The number of non-coherent accumulation is adaptively adjusted based on one or more factors such as, the channel condition and the number of peak selections done in Step 303. The output of Step 305 is fed into a selection module, where at Step 306, the UE selects a predefined number of coarse bins that are associated with one most likelihood PSC. The preferred number of coarse bin for LTE is three. Other number of coarse bins can be adopted based on the channel condition and/or overall system design. At Step 307, the UE performs non-coherent combination with fine frequency bins to select fine bins from the selected coarse bins. At Step 308, the UE performs fractional frequency offset estimation by performing a parabola interpolation on the chosen fine bins and get the interpolated frequency and fine time.

As shown from FIG. 3, one of the initial steps in the process is to divide the received signals into multiple frequency bins in a large frequency offset situation. The computational complexity of multi-bin processing can be reduced by using FFT implementation.

Figure 4:
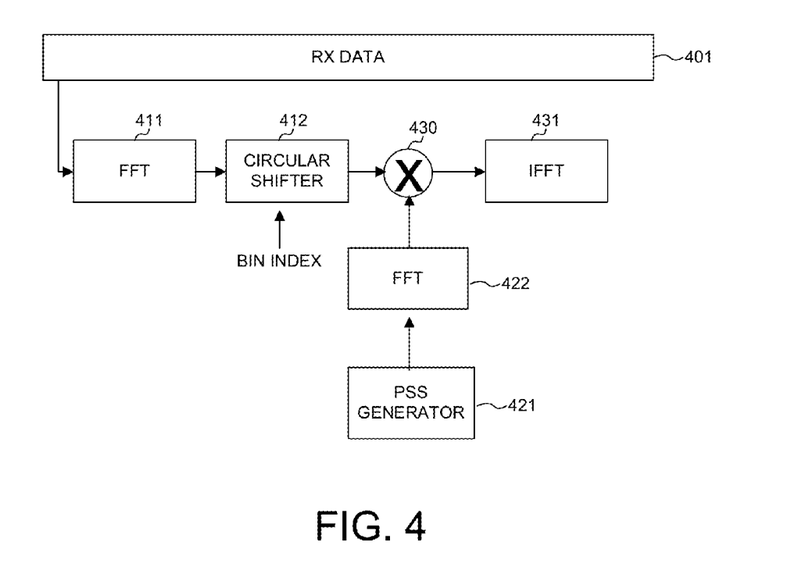
FIG. 4 shows an exemplary block diagram of a frequency-domain implementation for frequency bin processing in accordance with one embodiment of the invention.

FIG. 4 shows an exemplary block diagram of a frequency-domain implementation for frequency bin processing in accordance with one embodiment of the invention. The UE receives signaling data from data receiver 401. The received signal is passed to a FFT module 411 to do fast Fourier transform. The FFT module transforms the received data signal into frequency domain. A frequency bin generator 412 splits the frequency-domain signal data into multiple frequency bins in a high frequency offset environment. Each frequency bin is assigned a bin index. In one embodiment of the invention, the frequency bin generator 412 is a circular shifter. The generated frequency bin signals are passed to a mixer module 430. A PSS generator 421 generates PSS codes. In current LTE system, there are three PSC codes. In some embodiments of the invention, only two PSS codes are used due to conjugation. The PSS generator 421 passes the generated PSS signals to FFT module 422. FFT module 422 converts the signal into frequency domain and passes it to mixer 430. Mixer 430 mixes frequency domain signals from the each frequency bin of the received signal and the frequency domain PSS signals. Each combination of a frequency bin and a PSC is a hypothesis or a candidate. The mixed signal is then passed to IFFT 431, which converts the frequency domain signals to time domain signals. The detail of the implementation of these major steps is illustrated below.

Figure 5:
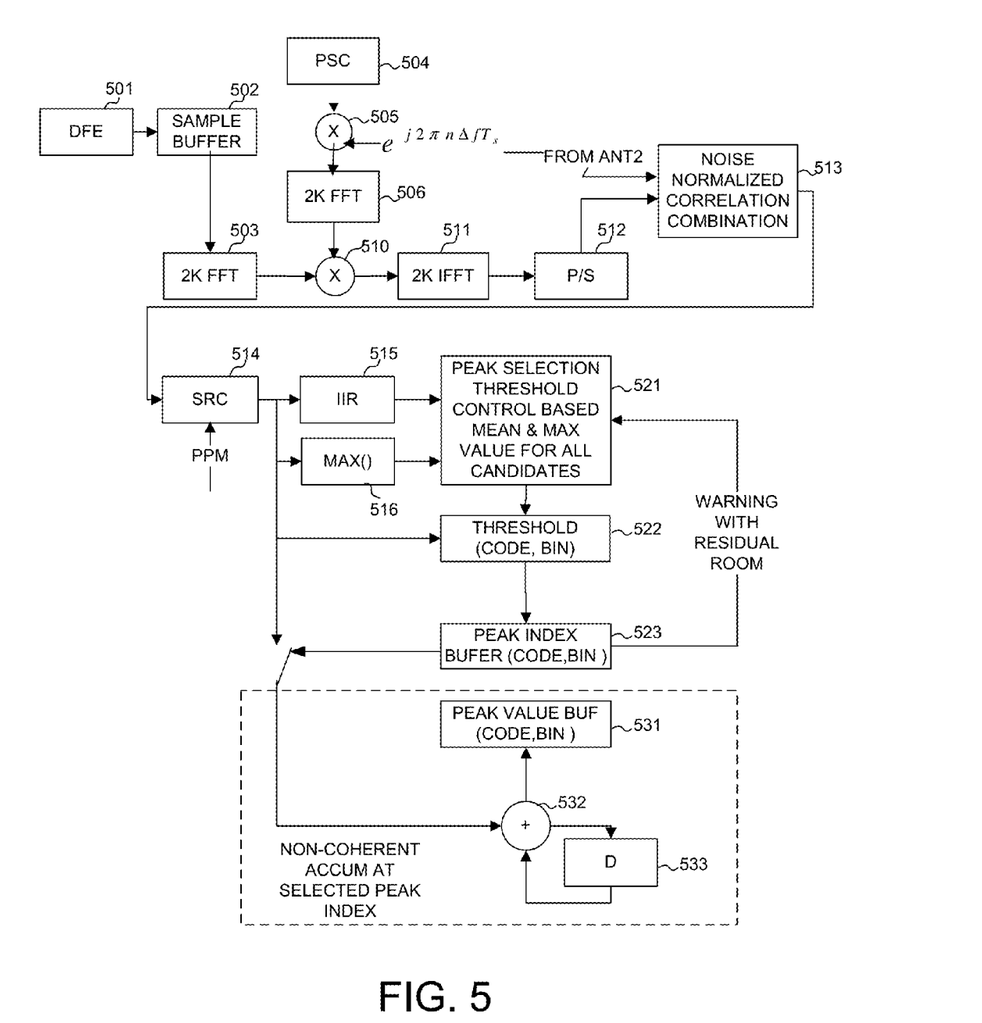
FIG. 5 shows an exemplary block diagram of the functional blocks that implements the adaptive multi-try based peak selection process for PSS in accordance with embodiments of the invention.

FIG. 5 shows an exemplary block diagram of the functional blocks that implement the adaptive multi-try based peak selection process for PSS in accordance with embodiments of the invention. Digital front end (DEF) module 501 receives and processes RF signals from an antenna. The output of the DFE feeds into Sample Buffer module 502 where the signals are sampled at a predefined sample rate and buffered. The output of the sample buffer feeds into 2K FFT module 503, where the signals are converted to frequency domain. The output of 2K FFT module 503 goes to mixer 510. At the other part of the process, PSC generator 504 generates primary synchronization code. At mixer 505, the PSC is mixed with a phase signal of $e^{j2\pi\Delta f Ts}$, where $\Delta f$ is frequency offset corresponding to the frequency bin and $T_s$ is the sampling period at the sample rate 1.98 MHz. The mixed signal is passed to 2K FFT module 506 where the PSC signals are transformed to frequency domain. The output of 2K FFT module 506 goes into mixer 510. Mixer 510 mixes the received signals in frequency domain and the PSC signals in frequency domain and passes it to 2K IFFT module 511. 2K IFFT module 511 converts the mixed signal from the frequency domain to the time domain and passes it to Parallel to Serial (P/S) module 512. P/S module 512 takes in parallel signals in the time domain, converts it to serial signal and feeds the serial signals to Noise Normalized Correlation Combination module 513. The above process generates source frequency bin hypothesis with each PSC.

In a multiple input and multiple output (MIMO) system, each antenna has the same set of process and modules (including modules 501, 502, 503, 504, 505, 506, 510, 511, and 512). The processed signals from one or more other antennae, like shown in FIG. 5, are also fed into Noise Normalized Correlation Combination module 513.

Sample Rate Converter (SRC) 514 receives the outputs from Noise Normalized Correlation Combination module 513 and performs a sample rate conversion if the frequency offset is large. After sample rate conversion (when large frequency offset was detected), the signals are passed on to Infinite Impulse Response (IIR) module 515 and Max Peak detection module 516. After this stage, all candidates are going to be evaluated based on adaptively adjusted thresholds or parameters. The adaptive functional modules are designed for large frequency offset environment. If the frequency offset is detected not to be large, the adaptive functions can be skipped.

When large frequency offsets are detected, the outputs of IIR 515 and Max 516 feed into module 521, which performs peak selection threshold control based mean and max value for all candidates. Threshold module 522 determines a threshold value for each hypothesis. Threshold module 522 selects the threshold value adaptively based on the outputs from SRC 514 and module 521. Threshold module 522 sets the threshold and passes it to Peak Index Buffer module 523, which buffers each hypothesis that meets the threshold value set by Threshold module 522. Peak Index Buffer module 523 also sends feedback information of warning with residual buffer room to module 521. A non-coherent accumulation is performed for the output of Peak Index Buffer module 523. The selected peak indexes, which are the output Peak Index Buffer 523, is fed into mixer 532, which takes delayed signals of module 533 and mixes with the inputs to generate non-coherent accumulation measures. The measurements from mixer 532 is fed into Peak Value Buffer module 531, which selects a predefined number of coarse bins based on the non-coherent accumulation measures.

Figure 6:
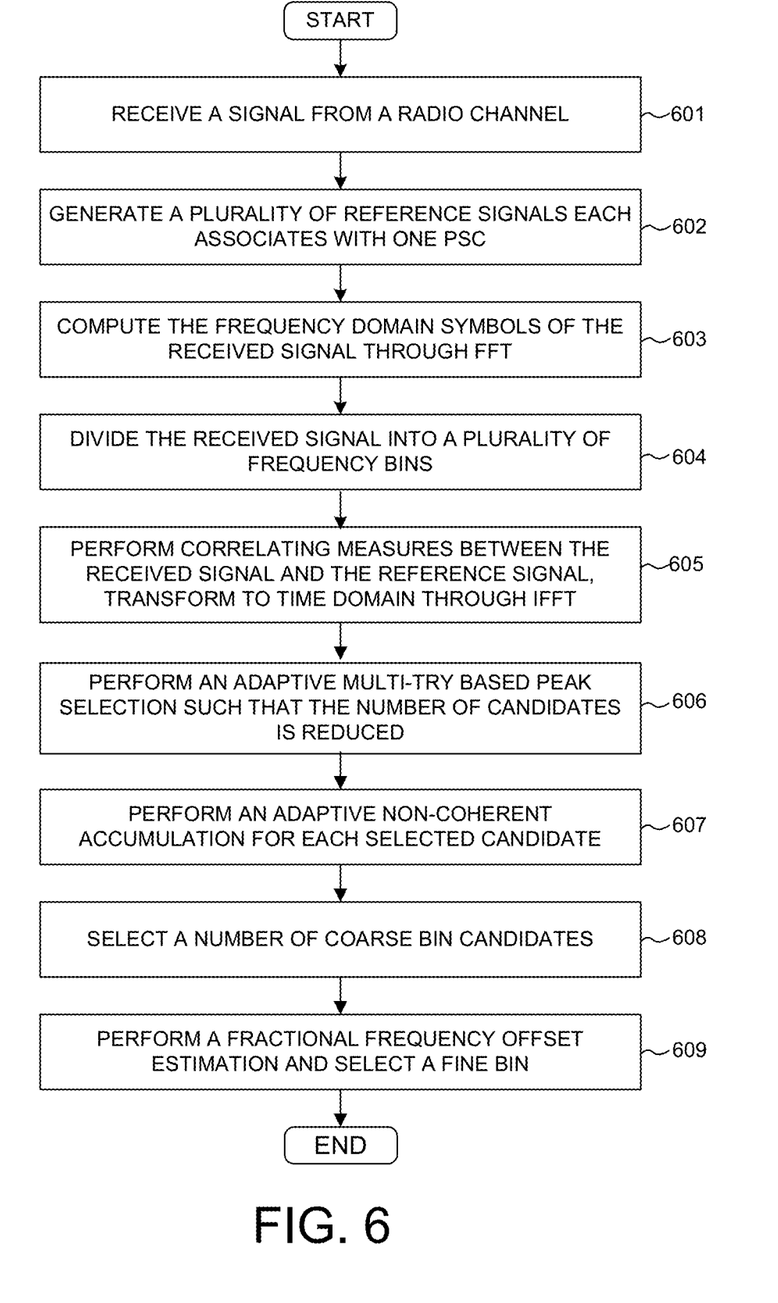
FIG. 6 illustrates a flow chart for multi-try based peak selection procedure of cell selection at a high-level view.

FIG. 6 illustrates a flow chart for multi-try based peak selection procedure of cell selection at a high-level view. Upon powering on, the UE starts to receive signals from a radio channel at Step 601. At Step 602, the UE generates a plurality of reference signals each associates with one PSC. In the current LTE system, there are three PSC for initial cell search. In some embodiments of the invention, two PSC are used instead of three PSC because of conjugation. At Step 603, the UE computes the frequency domain symbols of the received signal through FFT. At Step 604, the UE divides the received signal into a plurality of frequency bins. In some embodiments of the invention, the signal is divided into thirty-eight frequency bins with 3.75 kHz per bin. The number of frequency bins can be adjusted considering complexity of the implementation and other factors. At Step 605, the UE performs correlating measures between the received signal and the reference signal and transforms the signals to time domain through IFFT. At Step 606, the UE performs an adaptive multi-try based peak selection such that the number of candidates is reduced. In some embodiments of the invention, the number of the initial candidates also called hypothesis equal to three PSS codes multiplied by thirty-eight frequency bins. At Step 606, the UE sets an adaptively adjusted threshold and performs the correlation measurement a number of times to eliminate candidates that does not meet the threshold. The number of retry time is also adaptively adjusted based on factors such as the channel condition. At Step 607, the UE performs an adaptive non-coherent accumulation for each selected candidate. The number of accumulation for this step is adaptively adjusted based on factors such as the channel condition. At Step 608, the UE selects a number of coarse bin candidates. In one embodiment of the invention, the UE selects three coarse bin candidates associated with one most likelihood PSC. At Step 609, the UE performs fractional frequency offset estimation and selects a fine bin. The multiple peaks may be applied at this step for fractional frequency estimation if coarse bin frequency bin is not small enough. For example, at Step 604, the number of frequency bin can be set at a lower number due to correlation complexity or buffer size concerns. In such situation, the selected coarse bins may have a larger bandwidth, which is not small enough to select a fine bin. The above mentioned multiple peak selection can be used in Step 609.

As shown from the high-level flow chart in FIG. 6, one important step in the PSS procedure for cell selection is to set the multi-try number, which is the number of times that the UE performs the peak selection before it selects the first group of candidates.

Figure 7:
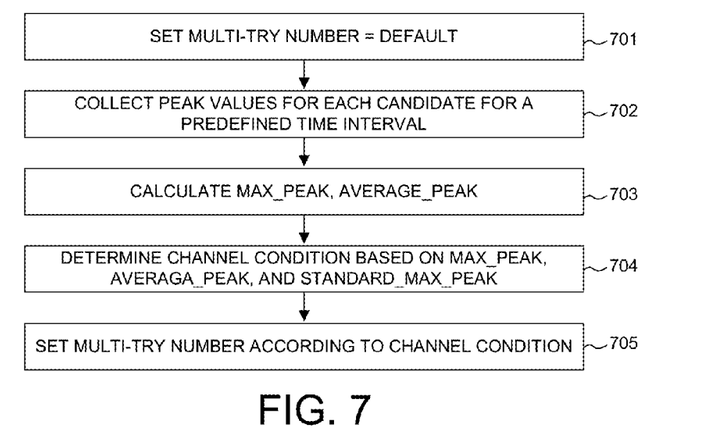
FIG. 7 shows a general flow chart of determining the multi-try number in accordance with embodiments of the invention.

FIG. 7 shows a general flow chart of determining the multi-try number in accordance with embodiments of the invention. At Step 701, the UE sets a default multi-try number to a predefined number. At Step 702, the UE collects peak values for each candidate for a predefined time interval. At Step 703, the UE calculates a maximum peak value and an average peak value from the collected information for all candidates. At Step 704, the UE determines the channel condition based on maximum peak value, average peak value and a predefined standard maximum peak value. At Step 705, the UE sets the multi-try number according to the channel condition.

Figure 8:
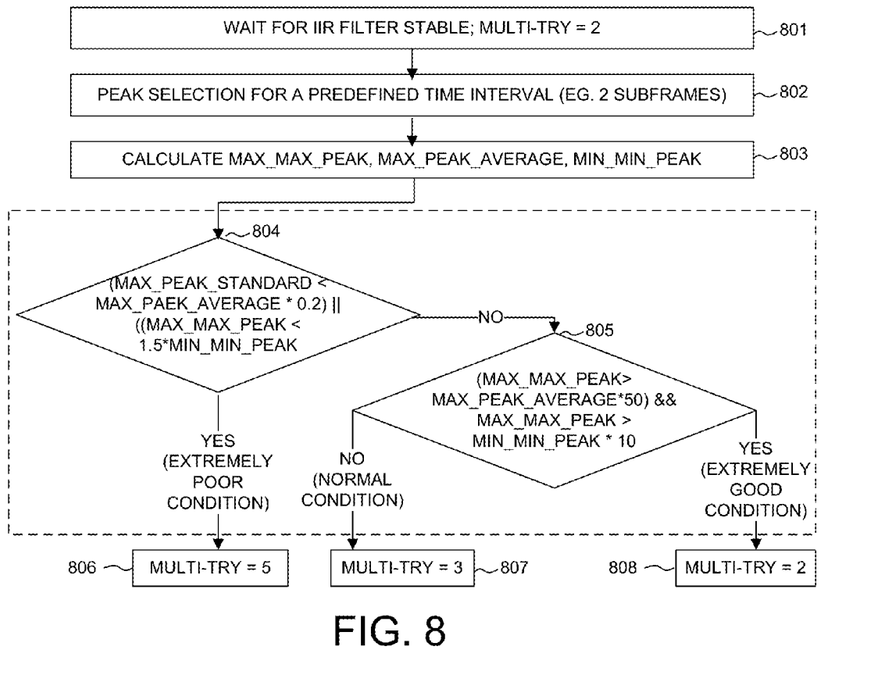
FIG. 8 illustrates an exemplary flow chart of determining the multi-try number for the adaptive multi-try based peak selection for cell selection procedure in accordance with one embodiment of the invention.

FIG. 8 illustrates an exemplary flow chart of determining the multi-try number for the adaptive multi-try based peak selection for cell selection procedure in accordance with one embodiment of the invention. At Step 801, the UE waits for the IIR filter to become stable and set the default multi-try value to be two. The default value can be configurable. In cases where the multi-try procedures are skipped, the default value applies. At Step 802, the UE performs peak selection for all candidates for a predefined time interval. In one embodiment of the invention, the predefined time interval is two subframes. The predefined time interval can be a configurable value. At Step 803, the UE calculates and finds the largest maximum peak value (max_max_peak), the average of all peak values (max_peak_average), and smallest peak value (min_min_peak). These accumulated values are used to estimate the channel condition.

At Step 804, the resulting peak values are further analyzed. In one embodiment of the invention, the UE evaluates two conditions. The first condition is whether the predefined standard maximum peak value is smaller than 0.2(first average peak factor) times the average of all peak values. The second condition is whether the largest maximum peak value, determined at Step 803, is smaller than 1.5(first minimum peak factor) times the smallest peak value. If either the first condition or the second condition is met, the UE determines at Step 804 that the channel condition is extremely poor. The UE, upon detecting extremely poor channel condition, moves on to Step 806 and sets the multi-try number accordingly. In one embodiment of the invention, the multi-try number is set to be five for extremely poor channel condition. If neither the first condition nor the second condition is met at Step 804, the UE moves on to Step 805 to evaluate other conditions. At Step 805, the UE evaluates the third condition. The third condition is whether the largest maximum peak value is greater than fifty times (second average peak factor) the average of all peak values, which is determined at Step 803. The fourth condition the UE evaluates at Step 805 is whether the largest maximum peak value is greater than ten times (second minimum peak factor) the smallest minimum peak value. If both the third condition and the fourth condition are met at Step 805, the UE determines that the channel condition is extremely good. Otherwise, the UE determines that the channel condition is normal. If Step 805 determines that the channel condition is extremely good, the UE moves on to Step 808 and sets the multi-try number accordingly. In one embodiment of the invention, the multi-try number is set to be two in extremely good channel condition. If Step 805 determines that the channel condition is normal, the UE moves on to Step 807 and sets the multi-try number accordingly. In one embodiment of the invention, the multi-try number is set to be three in normal channel condition.

The factors used in the above illustration can be changed based on system design and other network factors. The factors, including the first minimum peak factor, the second minimum peak factor, the first average peak factor, and the second average peak factor, are also configurable. These factors can be set to be statically for all users, in any conditions, or they can be configured differently for different users, in different conditions, or for different systems. Further, the algorithm to determine the channel condition can be statically set for all users and all system configurations. The channel condition algorithm can also be set dynamically for different users/user groups, for different systems, or for any other different factors. The corresponding multi-try numbers for each channel condition can be statically set for all users and all system configurations. The multi-try numbers can also be set dynamically for different users/user groups, for different systems, or for any other different factors.

Figure 9:
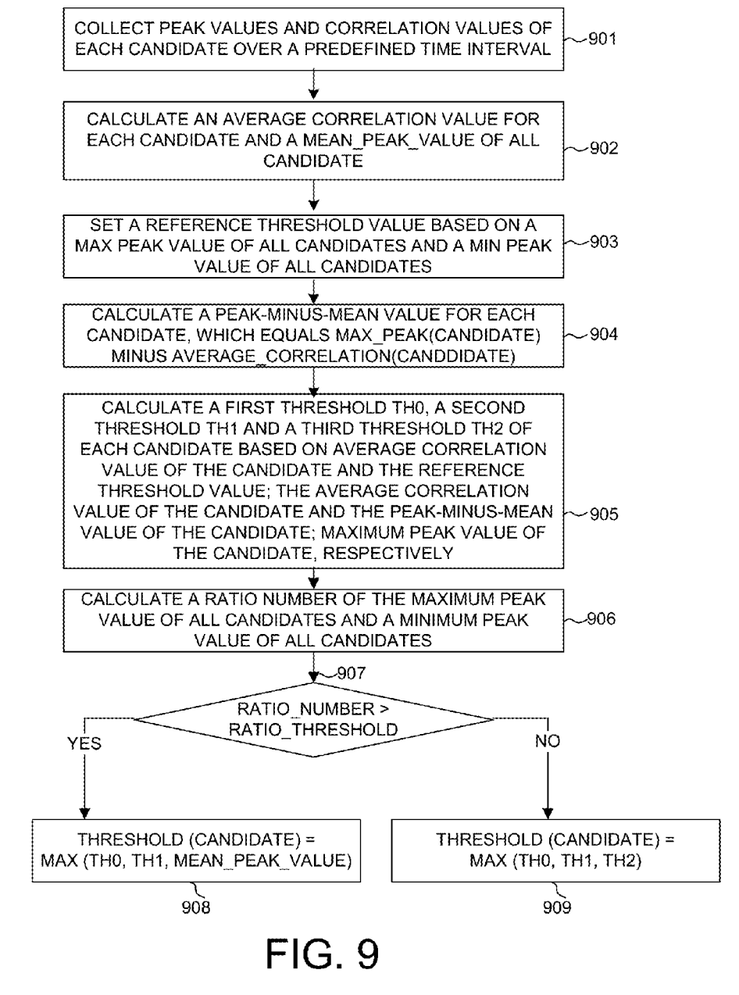
FIG. 9 shows a general flow chart of determining the peak-selection threshold value in accordance with embodiments of the invention.

The second important adaptive adjusted parameter for the multi-try based peak selection process is the threshold value for the peak selection. FIG. 9 shows a general flow chart of determining the peak-selection threshold value in accordance with embodiments of the invention. At Step 901, the UE collects peak values and correlation values of each candidate over a predefined time interval. Each candidate is defined by a frequency bin index (bin index) and a primary synchronization code index (sync code index). At Step 902, the UE calculates an average correlation value for each candidate (corr_average (candidate)) and a mean peak value (mean_peak) of all candidates. At Step 903, the UE sets a reference threshold value (ref_threshold) based on a maximum peak value (max_peak) of all candidates and a minimum peak (min_peak) value of all candidates. At Step 904, the UE calculates a value for each candidate called peak_minus_mean(candidate), where peak_minus_mean(candidate)=max_peak−corr_average (candidate). After collecting and setting up all the values, the UE further processes these data. At Step 905, the UE calculates a first threshold value th0, a second threshold value th1, and a third threshold value th2 for each candidate. The calculation is based on the collected data values, including the average correlation value for each candidate (corr_average (candidate)), the reference threshold value (ref_threshold) the peak minus mean value for each candidate (peak_minus_mean (candidate)) and the maximum peak value of all candidates (max_peak). At Step 906, the UE calculates a ratio number (ratio_number) of the maximum peak value of all candidates and a minimum peak value of all candidates. At Step 907, the UE determines the measurement condition based on the maximum and minimum peak value ratio. In other embodiments of the invention, other algorithm can be used to determine the measurement condition. If the UE, at Step 907, finds that the ratio number is greater than a predefined ratio threshold, the UE sets a threshold value for each candidate based on an algorithm at Step 908. If the ratio number is smaller than or equal to the predefined ratio threshold, the UE sets a threshold value for each candidate based on an algorithm at Step 909. In one embodiment of the invention, at Step 908, the threshold for each candidate equals to the largest value of the first threshold value of the candidate, the second threshold value of the candidate, and the mean peak value. At Step 909, the threshold value for each candidate equals to the largest value of the first threshold value of the candidate, the second threshold value of the candidate and the third threshold value of the candidate. In other embodiments of the invention, the algorithm for setting the threshold value for each candidate can be statically configured or can be dynamically configured based on other factors such as the system design and channel conditions.

Figure 10:
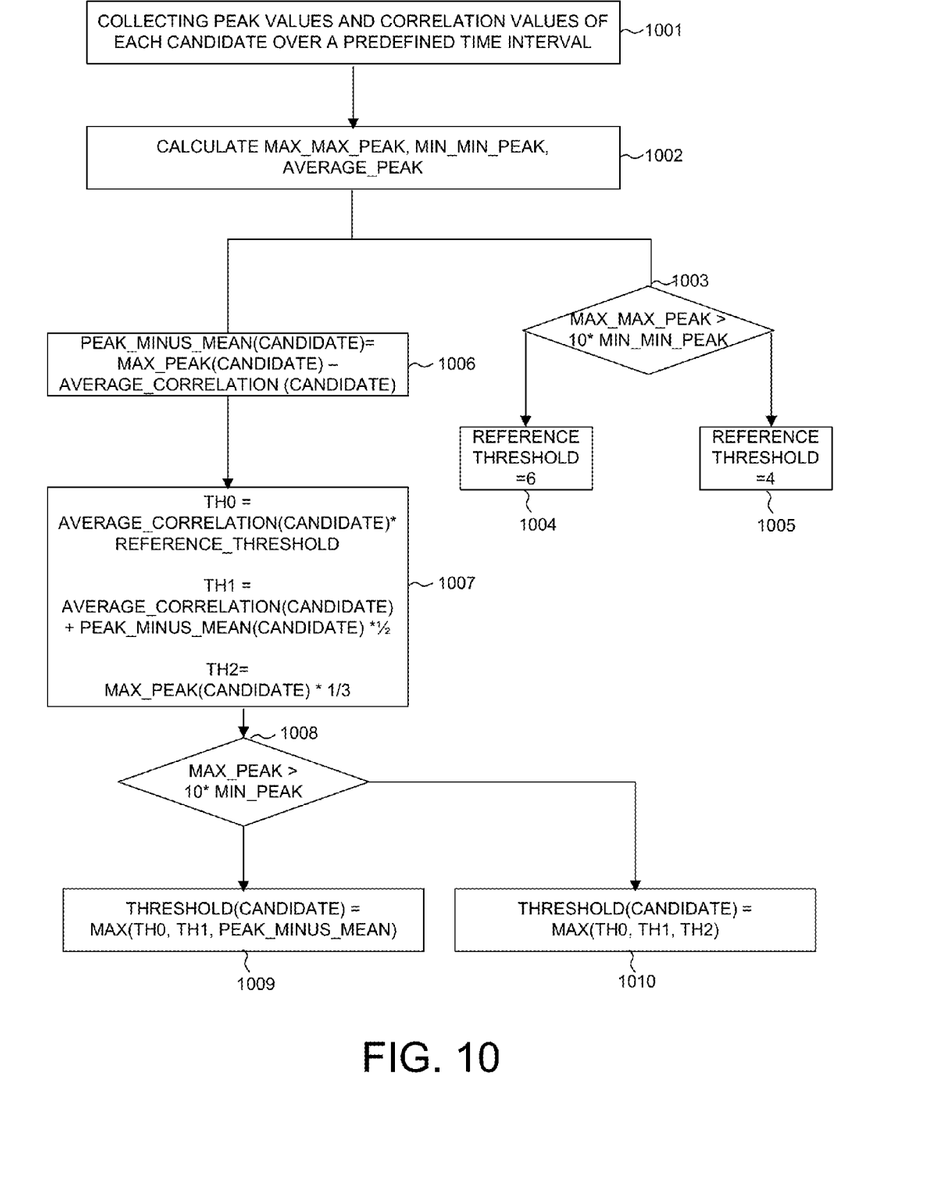
FIG. 10 illustrates an exemplary flow chart of determining the peak-selection threshold value in accordance with one embodiment of the invention.

FIG. 10 illustrates an exemplary flow chart of determining the peak-selection threshold value in accordance with one embodiment of the invention. At Step 1001, the UE collects peak values and correlation values of each candidate (corr_average (candidate)) over a predefined time interval. At Step 1002, the UE calculates maximum of the peak values (max_max_peak) and minimum of the peak values (min_min_peak) and the average peak values (average_peak) based on the collected values at Step 1001. At Step 1003, the UE determines a reference condition, which is the max_max_peak is greater than reference factor multiplies the min_min_peak. In one embodiment of the invention, the reference factor equals to ten. If the UE finds the reference condition is met, it moves on to Step 1004 by setting the reference threshold (ref_threshold) to a first reference threshold value. If the UE finds the reference condition is not met, it moves on to Step 1005 by setting the reference threshold (ref_threshold) to a second reference threshold value. In one embodiment of the invention, the first reference threshold equals six and the second reference threshold value equals four. The UE, at Step 1006, calculates a peak minus mean value for each candidate (peak_minus_mean (candidate)) by setting it to be max_peak minus corr_average(candidate). At Step 1007, the UE prepares three target threshold values based on the data collected and calculated before. The first threshold value th0 is defined as:

$$th0 = corr\_average(candidate) * ref\_threshold,$$

The second threshold value th1 is defined as:

$$th1 = corr\_average(candidate) + peak\_minus\_mean(candidate) * th1\_factor.$$

In one embodiment of the current invention, the th1 factor equals one half. The third threshold value th2 is defined as:

$$th2 = max\_peak(candidate) * th2\_factor.$$

In one embodiment of the current invention, the th2_factor equals one third.

At Step 1008, the UE determines a measurement condition that is the maximum peak value is greater than a peak value factor multiplies minimum peak value. In one embodiment of the invention, the peak value factor equals to ten. If the UE, at Step 1008, finds the measurement condition is met, it moves on to Step 1009 and sets the threshold for each candidate to be largest value of the first threshold, the second threshold and the peak minus mean value for each candidate. If the UE, at Step 1008, finds the measurement condition is not met, it moves on to Step 1010 and sets the threshold for each candidate to be largest value of the first threshold, the second threshold and the third threshold value for each candidate. One or more of the parameters in the above steps can be either statically configured, or dynamically configured according to the overall system design or other factors such as the channel condition.

After the UE has reduced the number of candidates, it applies non-coherent accumulation to reduce the candidates to a predefined number. When the Signal Noise Ratio is low, a higher number of non-coherent accumulations are required. Therefore, the number of accumulations is adaptively adjusted in accordance to embodiments of the invention.

Figure 11:
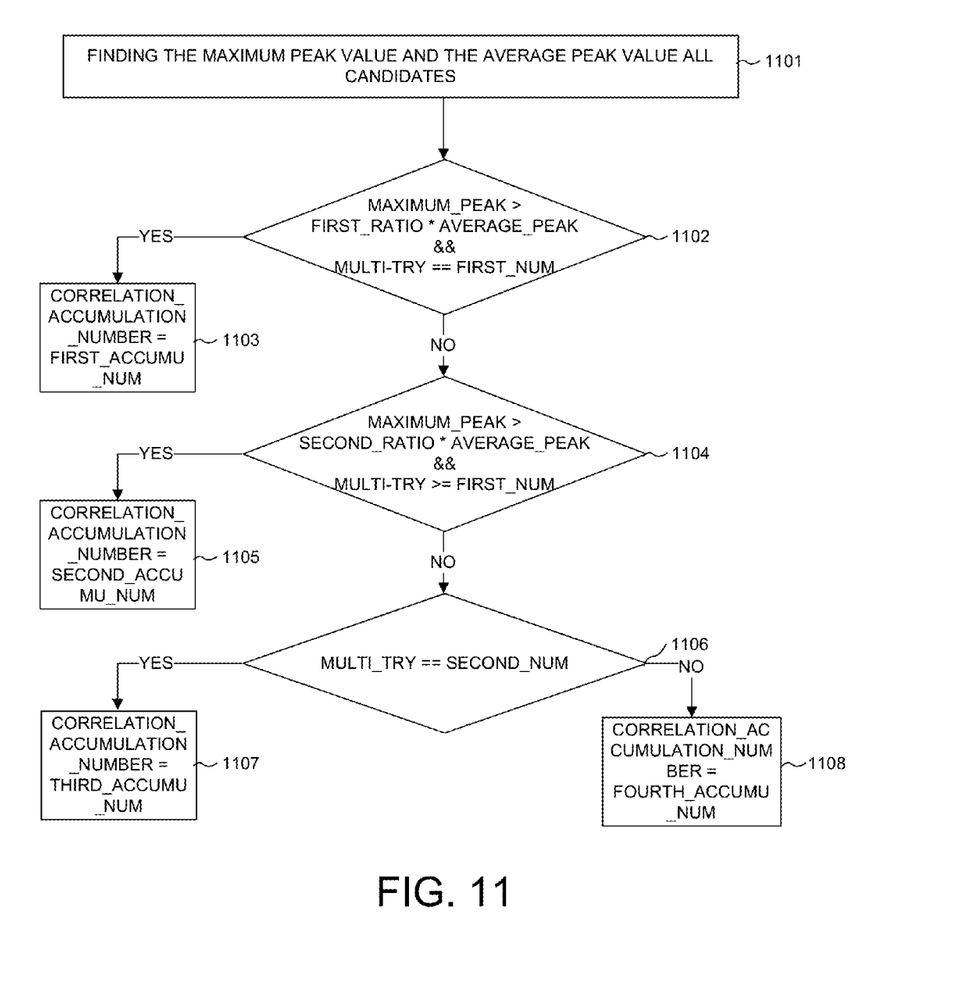
FIG. 11 shows an exemplary flow chart of adaptively adjusting the number of times to perform the non-coherent accumulation in accordance with embodiments of the invention.

FIG. 11 shows an exemplary flow chart of adaptively adjusting the number of times to perform the non-coherent accumulation in accordance with embodiments of the invention. The UE at Step 1101 finds the maximum peak value for all candidates and the average peak value for all candidates. After collecting all the data, the UE evaluates an accumulation condition based on the collected data and set the accumulation number accordingly. The accumulation condition correlates with the network SNR condition. In general, the lower the SNR, the more accumulation is required, hence the higher the accumulation number. The following illustrates in details some exemplary implementations.

At Step 1102, the UE determines a first accumulation condition based on the maximum peak value, the average peak value and the multi-try value determined in the previous process. In some embodiments of the invention, the first accumulation condition is the maximum peak value is greater than a first ratio multiplies the average peak value and the multi-try number equals to a first number. In one embodiment of the invention, the first ratio equals to 100 and the first number equals two. If the UE at Step 1102 finds the first accumulation condition is met, it moves on to Step 1103, where the UE sets the correlation accumulation number to a first accumulation number. In one embodiment of the invention, the first accumulation number equals two. If the UE at Step 1102 finds the first accumulation condition is not met, it moves on to Step 1104, where the UE determines a second accumulation condition. The second accumulation condition is based on maximum peak value, the average peak value and the multi-try value determined in the previous process. In some embodiments of the invention, the second accumulation condition is the maximum peak value is greater than a second ratio multiplies the average peak value and the multi-try number is greater than or equals to the first number. In one embodiment of the invention, the second ratio equals to fifty. If the UE at Step 1104 finds the second accumulation condition is met, it moves on to Step 1105, where the UE sets the correlation accumulation number to a second accumulation number. In one embodiment of the invention, the second accumulation number equals four. If the UE at Step 1104 finds the first accumulation condition is not met, it moves on to Step 1106, where the UE determines a third accumulation condition. The third accumulation condition is based on the multi-try number determined in the previous process. In one embodiment of the invention, the second number is set to be five. If the multi-try number equals to a second number, the UE moves on to Step 1107 and sets the correlation accumulation number to be the third accumulation number. In one embodiment of the invention, the third accumulation number is set to be sixteen. If the UE at Step 1106 finds the third accumulation condition is not met, the UE moves on to Step 1108 and sets the correlation accumulation number to be the fourth accumulation number. In one embodiment of the invention, the fourth accumulation number is set to be eight.

As discussed before, the multi-try number is based on the channel condition. A higher multi-try number is set when the UE detects an extremely poor channel condition. This number is used here as an indicator of the channel condition. As shown in the exemplary flow chart, the worse the channel condition is, the higher the correlation accumulation number is. Other algorithms can be configured to determine the level of accumulation number required. The parameters and the algorithm can be either statically configured or dynamically configured based on the overall system design and other factors.

After the UE performs the non-coherent correlation accumulation, it selects a predefined number of coarse frequency bins associated with one most likelihood PSC. The UE then performs fractional frequency offset estimation on the selected candidates to choose a fine bin candidate. In one embodiment of the invention, the predefined number of coarse bins is three.

Figure 12:
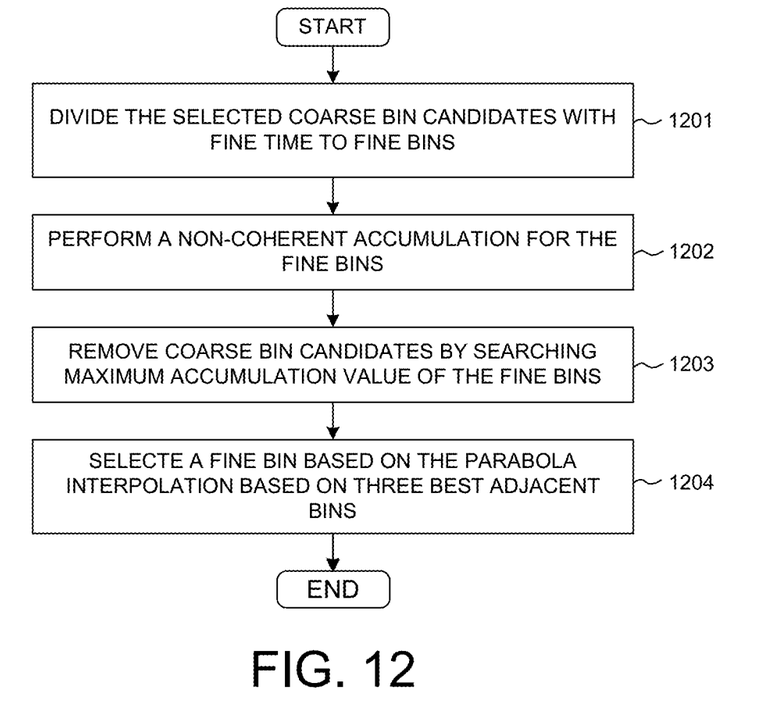
FIG. 12 shows an exemplary flow chart of the fractional frequency offset estimation in accordance with embodiments of the invention.

FIG. 12 shows an exemplary flow chart of the fractional frequency offset estimation in accordance with embodiments of the invention. At Step 1201, the UE divides the selected coarse bin candidates with fine time to fine bins. The number of fine bins is adjustable. It can be initially configured statically or dynamically based on the overall system design or other factors. At Step 1202, the UE performs a non-coherent accumulation for the fine bins. At Step 1203, the UE removes the coarse bin candidates by searching the maximum accumulation value of the fine bins. At Step 1204, the UE selects a fine bin based on the parabola interpolation based on three best adjacent bins.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a signal from a radio channel and computing frequency domain symbols of the received signal and a reference signal through a Fast Fourier Transform (FFT);
   dividing the received signal and the reference signal into a plurality of frequency bins, wherein the received signal in each frequency bin with a Primary Synchronization Code (PSC) is a first-group candidate;
   performing correlating measures between the received signal and the reference signals over a predefined time interval and de-mapping from the frequency domains through an Inverse Fast Fourier Transform (IFFT);
   obtaining correlation and peak values for each of the first-group candidate and determining a channel condition based on the peak values for the first-group candidates;
   adaptively adjusting a multi-try number and a set of thresholds based on the determined channel condition; and
   performing an adaptive multi-try based peak selection to select a plurality of second-group candidates for the multi-try number of times using the set of thresholds for each corresponding candidate, wherein the second-group candidates is a subset of the first-group candidates.

2. The method of claim 1, wherein the division of the received signal into multiple frequency bins is implemented by a circular shift method in frequency domain.

3. The method of claim 1, further comprising:
   performing a sample rate conversion for each frequency bin before performing the adaptive multi-try based peak selection.

4. The method of claim 1, wherein the channel condition is determined by a maximum peak value of all first-group candidates and a minimum peak value of all first-group candidates.

5. The method of claim 1, wherein the channel condition is determined by a maximum peak value of all first-group candidates and a minimum peak value of all first-group candidates, and wherein the threshold for each candidate is further based on peak values and correlation values of the first-group candidates.

6. The method of claim 1, further comprising:
   performing a non-coherent accumulation for each second-group candidate, wherein an accumulation number is adaptively adjusted; and
   selecting up to a predefined number of coarse bin candidates with the same PSC.

7. The method of claim 6, wherein the accumulation number is based on peak values of all first-group candidates and the multi-try number.

8. The method of claim 6, further comprising:
   performing a fractional frequency offset estimation from the selected coarse bin candidates; and
   selecting a fine bin from the selected coarse bin candidates.

9. The method of claim 8, further comprising:
   selecting a fine bin based on the parabolic interpolation result.

10. A device, comprising:
    a Fast Fourier Transform (FFT) unit computes frequency domain symbols of a received signal and a reference signal;
    a frequency bin module that divides the received signal and the reference signal into a plurality of frequency bins, wherein the received signal in each frequency bin with a Primary Synchronization Code (PSC) is a first-group candidate;
    a correlation module that performs correlating measures between the received signal and the reference signals and de-mapping from the frequency domains through an Inverse Fast Fourier Transform (IFFT);
    a multi-try based peak selection module that obtains a set of peak values for each of the first-group candidate, determines a channel condition based on sets of peak values for the first-group candidates, adaptively adjusts a multi-try number and a set of thresholds based on the determined channel condition, and performs an adaptive multi-try based peak selection to select a plurality of second-group candidates for the multi-try number of times using the set of thresholds for each corresponding candidate, wherein the second-group candidates is a subset of the first-group candidates.

11. The device of claim 10, wherein the division of the received signal into multiple frequency bins is implemented by a circular shift method in frequency domain.

12. The device of claim 10, further comprising:
    a sample rate converter that performs a sample rate conversion for each frequency bins before performing the adaptive multi-try based peak selection.

13. The method of claim 1, wherein the channel condition is determined by a maximum peak value of all first-group candidates and a minimum peak value of all first-group candidates.

14. The method of claim 1, wherein the channel condition is determined by a maximum peak value of all first-group candidates and a minimum peak value of all first-group candidates, and wherein the threshold for each candidate is further based on peak values and correlation values of the first-group candidates.

15. The device of claim 10, further comprising:
a non-coherent accumulator that performs a non-coherent accumulation for each second-group candidate, wherein an accumulation number is adaptively adjusted; and
a selection module that selects up to a predefined number of coarse bin candidates with the same PSC.

16. The device of claim 15, wherein the accumulation number is based on peak values of all first-group candidates and the multi-try number.

17. The device of claim 15, further comprising:
a fine bin module that performs a fractional frequency offset estimation from the selected coarse bin candidates; and
a fine bin selection module that selects a fine bin from the selected coarse bin candidates.

18. The device of claim 17, further comprising:
A parabolic module that selects a fine bin based on the parabolic interpolation result.

* * * * *